United States Patent
Lee et al.

(10) Patent No.: US 8,674,030 B2
(45) Date of Patent: Mar. 18, 2014

(54) MODIFIED HIGH CIS CONJUGATED DIENE COPOLYMER AND MANUFACTURING METHOD OF THE SAME

(71) Applicant: Chi Mei Corporation, Tainan (TW)

(72) Inventors: Chih-Cheng Lee, Tainan (TW); Kuei-Lun Cheng, Tainan (TW)

(73) Assignee: Chi Mei Corporation, Tainan (TW)

( * ) Notice: Subject to any disclaimer, the term of this patent is extended or adjusted under 35 U.S.C. 154(b) by 0 days.

(21) Appl. No.: 13/669,645

(22) Filed: Nov. 6, 2012

(65) Prior Publication Data

US 2013/0158205 A1 Jun. 20, 2013

(30) Foreign Application Priority Data

Dec. 16, 2011 (TW) .............................. 100146899 A

(51) Int. Cl.
*C08F 8/42* (2006.01)
*C08F 36/14* (2006.01)

(52) U.S. Cl.
USPC ................... 525/333.1; 525/333.2; 525/331.9

(58) Field of Classification Search
None
See application file for complete search history.

(56) References Cited

U.S. PATENT DOCUMENTS

| | | | |
|---|---|---|---|
| 4,520,177 A | 5/1985 | Jenkins | |
| 4,544,718 A | 10/1985 | Yeh et al. | |
| 5,220,045 A | 6/1993 | Knauf et al. | |
| 6,008,295 A * | 12/1999 | Takeichi et al. | 525/105 |
| 6,228,908 B1 * | 5/2001 | Takeichi et al. | 524/27 |
| 6,369,167 B1 * | 4/2002 | Morita et al. | 525/342 |
| 6,433,065 B1 * | 8/2002 | Lin et al. | 524/492 |
| 6,573,412 B1 * | 6/2003 | Hogan et al. | 568/616 |
| 6,992,147 B1 | 1/2006 | Ozawa et al. | |
| 2005/0020757 A1 * | 1/2005 | Ozawa et al. | 524/492 |
| 2005/0070672 A1 * | 3/2005 | Ozawa et al. | 525/331.9 |
| 2006/0030677 A1 | 2/2006 | Ozawa et al. | |
| 2009/0292043 A1 * | 11/2009 | Kurazumi et al. | 523/152 |

FOREIGN PATENT DOCUMENTS

| | | |
|---|---|---|
| EP | 1449857 A1 | 8/2004 |
| EP | 1479698 A1 | 11/2004 |
| WO | WO 97/39055 | 10/1997 |

OTHER PUBLICATIONS

EP Search Report dated Feb. 27, 2013.
English language translation of abstract of WO 97/39055 (published Oct. 23, 1997, p. 1 of publication).

* cited by examiner

*Primary Examiner* — Robert S Loewe
(74) *Attorney, Agent, or Firm* — McClure, Qualey & Rodack, LLP

(57) ABSTRACT

A modified conjugated diene polymer and a manufacturing method for the same are provided. The modified conjugated diene polymer is manufactured by the method including, forming a conjugated diene polymer by a polymerization step and making it react with a first modifier and then react with a second modifier. The modified conjugated diene polymer has over 97% of cis-1,4 structure. A PDI of the modified conjugated diene polymer is bigger than 1.8 and smaller than 2.5. The first modifier has a chemical formula of $X-R1-Si(R2)_3$. The second modifier has a chemical formula of $R3-Si(R4)_3$.

16 Claims, No Drawings

MODIFIED HIGH CIS CONJUGATED DIENE COPOLYMER AND MANUFACTURING METHOD OF THE SAME

This application claims the benefit of Taiwan application Serial No. 100146899, filed Dec. 16, 2011, the subject matter of which is incorporated herein by reference.

BACKGROUND

1. Technical Field

The disclosure relates to a polymer and more specifically to a modified high cis conjugated diene polymer with high content (not less than 97%) of cis structure.

2. Description of the Related Art

Conjugated diene polymer is widely used for resin modifying applications and various industrial goods. One of use is for manufacturing tires. Demand for low fuel consumption and attrition for the tires has increased with increasing environmental consciousness. For conforming the demand trend, the rolling resistance property, the wet traction property, the tensile strength property, etc. of mechanical characteristics of the conjugated diene polymer are very important.

The conjugated diene polymer having high content of cis-1,4 structure has good mechanical characteristics. Therefore are many conventional methods for manufacturing the conjugated diene polymer having high content of the cis-1,4 structure. In those methods, catalysts formed by a combination of a metal compound, such as a Ni series, a Ti series, a Co series, a La series, etc., and an organic aluminum compound are usually used.

The method for manufacturing the high cis conjugated diene polymer by using a lanthanide series metal has been increased to a mass production since the year of nineteen nineties. The conjugated diene polymer having high content of cis structure formed by a polymerization process using the lanthanide series metal compound as the catalyst composition has perfect linearity of the polymer chain and heavier molecular weight. Therefore, the conjugated diene polymer having high content of cis structure can be applied to applications of the tires, industrial goods. In addition, the conjugated diene polymer having high content of cis structure can be used for manufacturing goods having impact resistance.

There is no limit to methods for manufacturing a conventional catalyst composition of lanthanide series metal carboxylate. For example, the methods disclosed in U.S. Pat. No. 4,544,718, U.S. Pat. No. 4,520,177 or U.S. Pat. No. 5,220,045, etc may be used. Preferably, the lanthanide series metal carboxylate may be manufactured by using materials of a lanthanide series metal oxide, an organic carboxylic acid and a huge amount of water. The lanthanide series metal oxide may use $Nd_2O_3$, $Pr_{11}O_{16}$, or $Ce_2O_3$, etc. The organic carboxylic acid is neodecanoic acid, lauric acid, tetradecanoic acid, or naphthenic acid, etc.

Currently, carbon black is added to the conjugated diene polymer to increase the strength of the tires. In recent years, due to the depletion of oil resource and the global warming issue, the industries have many methods by using silica as a reinforcing filler. In comparison with carbon black, silica is more difficult to be uniformly distributed in conjugated diene polymer. Therefore, the compatibility between silica and conjugated diene polymer needs to be further increased. According to one improvement method, when adding silica to the conjugated diene polymer during the manufacturing process of tires, a modifier is used when performing blending. However, since the blending uniformity largely affects the properties of the products, product quality may differ from batch to batch, and quality reproducibility is poor. Moreover, it is hard to make sure if the conjugated diene polymer is modified by the modifier, or the modifier only reacts with silica. Therefore, it is a prominent task for the industries to investigate a method for manufacturing the conjugated diene polymer with well dispersion property of silica.

SUMMARY

A modified high cis conjugated diene polymer is provided. The modified high cis conjugated diene polymer is manufactured by a method comprising forming a high cis conjugated diene polymer by a polymerization step and enabling the high cis conjugated diene polymer to react with a first modifier and then react with a second modifier to obtain the modified high cis conjugated diene polymer. A cis-1,4-structure of modified high cis conjugated diene polymer is higher than 97%. The polydispersity index (PDI) of the modified high cis conjugated diene polymer is greater than 1.8 and less than 2.5. The first modifier has a chemical formula of X—R1-Si(R2)$_3$. X is a functional group selected from an epoxypropoxy group, an isocyanate group, and a 2-(3,4-epoxycyclohexyl group). R1 is an alkylene group with 2~3 carbon atoms. R2 is an alkyl group with 2~3 carbon atoms or an alkoxy group with 1~3 carbon atoms. The second modifier has a chemical formula of R3-Si(R4)$_3$. R3 is selected from the group consisting of an alkyl group, an alkoxy group, an aromatic group, an aryloxy group and a cycloalkyl group with 1~12 carbon atoms. R4 is selected from the group consisting of an alkyl group, an alkoxy group, an aryloxy group and a cycloalkyl group with 1~12 carbon atoms.

A method for manufacturing a modified high cis conjugated diene polymer is provided. The method comprises performing a polymerization step to form a high cis conjugated diene polymer, and enabling the high cis conjugated diene polymer to react with a first modifier and then react with a second modifier. A cis-1,4-structure of the modified high cis conjugated diene polymer is higher than 97%. The polydispersity index (PDI) of the modified high cis conjugated diene polymer is greater than 1.8 and less than 2.5. The first modifier has a chemical formula of X—R1-Si(R2)$_3$. X is a functional group selected from the group consisting of epoxypropoxy group, an isocyanate group, and a 2-(3,4-epoxycyclohexyl group). R1 is an alkylene group with 2~3 carbon atoms. R2 is an alkyl group with 2~3 carbon atoms or an alkoxy group with 1~3 carbon atoms. The second modifier has a chemical formula of R3-Si(R4)$_3$. R3 is selected from the group consisting of an alkyl group, an alkoxy group, an aromatic group, an aryloxy group and a cycloalkyl group with 1~12 carbon atoms. R4 is selected from the group consisting of an alkyl group, an alkoxy group, an aryloxy group and a cycloalkyl group with 1~12 carbon atoms.

BRIEF DESCRIPTION OF THE DRAWINGS

None

DETAILED DESCRIPTION

In embodiments, a modified high cis conjugated diene polymer is provided. The modified high cis conjugated diene polymer is manufactured by a method comprising a polymerization step for polymerizing conjugated diene monomers to form a high cis conjugated diene polymer. The polymerization step for polymerizing the conjugated diene monomers may be performed with existence of a solvent of proper amount. In embodiments, the high cis conjugated diene polymer is formed by polymerizing the conjugated diene monomers in existence of a catalyst composition.

Next, the high cis conjugated diene polymer formed by the polymerization step is reacted with a first modifier and then reacted with a second modifier to obtain the modified high cis conjugated diene polymer. In embodiments, after the high cis conjugated diene polymer is reacted with the first modifier, the second modifier to obtain the modified high cis conjugated diene polymer, an evaporating step such as direct devolatilizing by an extruder, a stripping step, and a drying step etc., may be performed to obtained the more pure modified high cis conjugated diene polymer.

In embodiments, the catalyst composition is composed of (a) a lanthanide series metal organic carboxylate, (b) an organic aluminum compound, (c) a Lewis acid.

The above mentioned (a) lanthanide series metal organic carboxylate comprise: neodymium trichloride, didymium trichloride which is composed of 72 wt % of neodymium, 20 wt % of lanthanum and 8 wt % of praseodymium, neodymium 2-ethylhexanoate, didymium 2-ethylhexanoate, neodymium naphthenate, neodymium 2,2-diethylhexanoate, neodymium neodecanoate and so on.

In addition, the above mentioned (b) organic aluminum compound is composed of an aluminium alkyl having a molecular formula of $AlR'_3$, $HAlR'_2$ or $R'AlH_2$, for example, comprising trimethylaluminum, triethyl aluminum, triisopropylaluminum, tributylaluminum, triisobutylaluminum, trihexylaluminum, tricyclohexylaluminum, tri-n-octyl aluminum, diethylaluminum hydride, dipropylaluminum hydride, dibutylaluminum hydride, di-isobutyl aluminum hydride (DIBAH), ethylaluminum dihydride, propylaluminum dihydride or isobutylaluminum dihydride and so on. In one preferable embodiment, the aluminium alkyl having the molecular formula of $AlR'_3$ or $HAlR'_2$ is used.

In embodiments, the (c) Lewis acid is composed of an alkylaluminum halide. The (c) Lewis acid may have a structural formula of $R'AlCl_2$, $R'_3Al_2Cl_3$ or $R'_2AlCl$, etc. R' is a hydrocarbon group with 8~12 carbon atoms. For example, the (c) Lewis acid comprise dimethylaluminum chloride, diethylaluminum chloride, di-isobutyl aluminum chloride (DIBAC), dioctylaluminum chloride, ethylaluminum sesquichloride, ethylaluminum dichloride, or a bromide or iodide thereof.

A ratio between the each catalyst material of the catalyst composition has to be limited for obtaining a high cis conversion ratio for the polymerization for the high cis conjugated diene polymer. For example, a mole of the (a) lanthanide series metal organic carboxylate: a total mole of the (c) Lewis acid and the (b) organic aluminum compound is 1:1.5~1:100, preferably 1:1.5~1:60. In one embodiment, for example, a mole of neodymium neodecanoate: a total mole of diethylaluminum chloride and di-isobutyl aluminum hydride is 1:11. The mole of the (a) lanthanide series metal organic carboxylate: the mole of the (c) Lewis acid is controlled to be 1:0.5~1:10 preferably. In one embodiment, for example, the mole of neodymium neodecanoate: the mole of diethylaluminum chloride is controlled to be 1:3.

In embodiments, the high cis conjugated diene polymer is formed by polymerizing conjugated diene monomers. For example, the conjugated diene monomer comprises 1,3-butadiene, isoprene, 2-phenylbutadiene, 2,3-dimethylbutadiene, 1,3-hexadiene, 1,3-octadiene or a combination thereof.

The catalyst composition for the polymerization of the conjugated diene monomer comprises: a solution of the (a) lanthanide series metal organic carboxylate, a solution of the (c) Lewis acid and a solution of the (b) organic aluminum compound. The solution of the (b) organic aluminum compound is obtained by well mixing the (b) organic aluminum compound and a proper solvent. A process temperature for the catalyst composition is controlled according to a melting point and a boiling point of the solvent, to be −20~120 preferably. The above mentioned catalyst substances may be applied into the mixer respectively. Preferably, after the (b) organic aluminum compound and the (a) lanthanide series metal organic carboxylate are added, the (c) Lewis acid is added into the mixer. In some significant conditions, the (b) organic aluminum compound and the (a) lanthanide series metal organic carboxylate may be mixed together before the polymerization step.

In embodiments, in the step for preparing the catalyst composition solution, a small amount of the conjugated diene monomer may be added into the mixer, that is, the catalyst composition may further comprise the conjugated diene monomer. Therefore, a catalytic activity of the catalyst composition is increased. In addition, an inducing time for the catalyst composition during the polymerization process is decreased. Timing for adding the conjugated diene monomer into the catalyst composition may be any timing when each of the catalyst substances was added. The amount of the conjugated diene monomer may be based on the (a) lanthanide series metal organic carboxylate compound. In one embodiment, the mole of the (a) lanthanide series metal organic carboxylate: a mole of the conjugated diene monomer is 1:0~1:1000, preferably 1:0.5~1:500, more preferably 1:2~1:100. The conjugated diene monomer may be an isoprene, a butadiene, or 1,3-pentadiene, etc.

In embodiments, in the step for polymerizing the conjugated diene monomers, the conjugated diene monomer may be pumped into a reaction tank before or after the catalyst composition is added, or between timings of adding one catalyst substance of the catalyst composition and another catalyst substance of the catalyst composition. The amount of conjugated diene monomer may be added only once, or added by fractional steps. In embodiments, the reaction tank is equipped with a stirrer preferably. One reaction tank or a plurality of reaction tanks connected in series may be used. A batch feeding method is preferable. As the polymerization reaches a specific conversion ratio, the first modifier is added into the polymer solution in the reaction tank. After the first modifier is added for a period of time, the second modifier is added. A mole ratio of the first modifier to the lanthanide series metal is 1~10, or 3~5 preferably. A mole ratio of the first modifier to the second modifier may be 0.3~10, or 3~5 preferably.

The first modifier has a chemical formula of X—R1-Si(R2)$_3$. X is a functional group selected from the group consisting of an epoxypropoxy group, an isocyanate group, and a 2-(3,4-epoxycyclohexyl group). R1 is an alkylene group with 2~3 carbon atoms. R2 is an alkyl group with 2~3 carbon atoms, or an alkoxy group with 1~3 carbon atoms.

For example, the first modifier is selected from the group consisting of 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, methyl(3-glycidoxypropyl)dimethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyl(methyl)dimethoxysilane, 3-isocyanatopropyltrimethoxysilane, 3-isocyanatopropyltriethoxysilane, 3-isocyanatopropylmethyldiethoxysilane, 3-isocyanatopropyltriisopropoxysilane and a combination thereof.

The second modifier has a chemical formula of R3-Si(R4)$_3$. R3 is selected from the group consisting of an alkyl group, an alkoxy group, an aromatic group, an aryloxy group and a cycloalkyl group with 1~12 carbon atoms. R4 is selected from the group consisting of an alkyl group, an alkoxy group, an aryloxy group and a cycloalkyl group with 1~12 carbon atoms.

For example, the second modifier is selected from the group consisting of tetraethoxysilane (TEOS), ethyl(trimethoxy)silane, phenyl(tri-n-butoxy)silane, dicyclohexyl (diphenoxy)silane, didecyl(didecoxy)silane, tetradodecoxysilane, tetraphenoxysilane and a combination thereof.

An amount of the first modifier may be 0.005~0.009 mol/Kg of the high cis conjugated diene polymer.

An amount of the second modifier may be 0.0016~0.009 mol/Kg of the high cis conjugated diene polymer.

The second modifier functions as a modifier for the high cis conjugated diene polymer, that is, the single molecule in the second modifier reacts only the single high cis conjugated diene polymer. In other words, the second modifier does not functions as a coupling agent for the high cis conjugated diene polymer, that is, the single molecule in the second modifier does not be a linker to connect a plurality of the high cis conjugated diene polymers together. Therefore, in embodiments, the PDI of the modified high cis conjugated diene polymer is not increased after adding the second modifier.

In embodiments, the polydispersity index (PDI) of the modified high cis conjugated diene polymer is smaller than 2.5. For example, PDI of the modified high cis conjugated diene polymer is greater than 1.8 and less than 2.5 (1.8<the PDI of the modified high cis conjugated diene polymer<2.5), or PDI of the modified high cis conjugated diene polymer is greater than 1.8 and less than 2.3 (1.8<a PDI of the modified high cis conjugated diene polymer<2.3). In addition, the modified high cis conjugated diene polymer has a cis-1,4-structure over 97%. A weight average molecular weight of the modified high cis conjugated diene polymer is 20,000~1,000,000. The modified high cis conjugated diene polymer has a —CH$_2$—CH(OH)—CH$_2$—O—R1-Si(R2)$_3$ group of 0.001~0.02 mol/Kg of the high cis conjugated diene polymer, or of 0.005~0.009 mol/Kg of the high cis conjugated diene polymer.

A number of embodiments are disclosed below to provide detailed descriptions of the disclosure.

<Catalyst Composition Preparation>

0.162 mole of neodymium neodecanoate, 1.296 mole of di-isobutyl aluminum hydride (DIBAH) and 0.486 mole of diethylaluminum chloride (DEAC) are mixed using n-hexane as a solvent in room temperature. The mass contents of Nd element is 0.26 wt % of the catalyst composition. The mole of neodymium neodecanoate: the total mole of the diethylaluminum chloride and the di-isobutyl aluminum hydride is 1:11. The mole of neodymium neodecanoate: the mole of diethylaluminum chloride is controlled to be 1:3.

<Modified High Cis Conjugated Diene Polymer of Embodiment 1~Comparative Example 8, Un-Modified High Cis Conjugated Diene Polymer of Comparative Example 9>

Table 1 shows the mole ratio of the first modifier (3-glycidoxypropyltrimethoxysilane) to the second modifier (TEOS) in embodiments and comparative examples, represented as the term of first modifier/second modifier mole ratio. In addition, Table 1 shows the mole ration of the (a) lanthanide series metal in the catalyst composition to the first modifier, represented as the term of Nd/first modifier mole ratio.

TABLE 1

|  | mole ratio of Nd/ first modifier | mole ratio of first modifier/ second modifier |
| --- | --- | --- |
| Embodiment 1 | 1/1 | 1/3 |
| Embodiment 2 | 1/2 | 2/4 |
| Embodiment 3 | 1/3 | 3/1 |
| Embodiment 4 | 1/3 | 3/5 |
| Embodiment 5 | 1/5 | 5/1 |
| Embodiment 6 | 1/5 | 5/3 |
| Embodiment 7 | 1/10 | 10/1 |
| Comparative example 8 | 1/3 | 3/0(1) |
| Comparative example 9 | 1/0 | 0/0 |

P.S.: The mole ratio of first modifier/second modifier in comparative example 8, which represented as 3/0(1), indicates that no second modifier is added during the step for preparing the modified high cis conjugated diene polymer, that is the amount of the second modifier is 0; the second modifier is added in a step for preparing a rubber composition by using the modified high cis conjugated diene polymer; the amount of the second modifier is 1 mole on the basis of the amount of first modifier, which is regarded as 3 moles, during the preparing step of the modified high cis conjugated diene polymer.

Manufacturing methods for the modified high cis conjugated diene polymer in embodiments 1~7 are similar, and differences between which are the amount of the first modifier (3-glycidoxypropyltrimethoxysilane), the second modifier (TEOS) and the catalyst composition mainly. The manufacturing method for the modified high cis conjugated diene polymer is illustrated below using embodiment 3 as example.

In the method for the modified high cis conjugated diene polymer in embodiment 3, 60 Kg of n-hexane is poured into the reaction tank, and the temperature of the reaction tank is set to be heated to 60. After 9 Kg of butadiene is poured into the reaction tank, 2 Kg of n-hexane is poured into the reaction tank. Next, 900 g of the catalyst composition having 0.26 wt % of Nd prepared in the step of <CATALYST COMPOSITION PREPARATION> is added into the reaction tank. After the temperature of the reaction tank reaches the highest (60), 115 g of the first modifier KBM-403 (having the concentration 10% of 3-glycidoxypropyltrimethoxysilane, using n-hexane as the solvent) is poured into the reaction tank. After the reaction is performed for about 5 minutes, 34 g of the second modifier TEOS (having the concentration 10% of 3-glycidoxypropyltrimethoxysilane, using n-hexane as the solvent) is added. After the mixer is stirred for about 30 minutes, it is discharged. Therefore, the modified high cis conjugated diene polymer is obtained. This polymer is analyzed to have 98% of the cis structure by comparing absorption number for infrared of 740 cm$^{-1}$ with the standard sample.

The modified high cis conjugated diene polymer of comparative example 8 is different from the modified high cis conjugated diene polymers of embodiments 1~7 in that no second modifier is used in the modifying step in comparative example 8.

Comparative example 9 is different form embodiments 1~7 in that, in comparative example 9, none of the first modifier and the second modifier is used, and 4.5 g of SnCl$_4$ is added, therefore the un-modified high cis conjugated diene polymer is obtained.

Table 2 shows characteristics of the modified high cis conjugated diene polymers of embodiment 1~comparative example 8 and the un-modified high cis conjugated diene polymer of comparative example 9.

TABLE 2

|  | first modifier content (mol/Kg) | weight average molecular weight (ten thousand) | number average molecular weight (ten thousand) | PDI |
|---|---|---|---|---|
| Embodiment 1 | 0.0018 | 20 | 44 | 2.2 |
| Embodiment 2 | 0.0036 | 18 | 41 | 2.195 |
| Embodiment 3 | 0.0054 | 20 | 45 | 2.148 |
| Embodiment 4 | 0.0054 | 21 | 45 | 2.125 |
| Embodiment 5 | 0.009 | 21 | 47 | 2.2 |
| Embodiment 6 | 0.009 | 21 | 46 | 2.199 |
| Embodiment 7 | 0.018 | 21 | 46 | 2.21 |
| Comparative example 8 | 0.0054 | 21 | 48 | 2.34 |
| Comparative example 9 | 0 | 21 | 51 | 2.36 |

In table 2, the term of first modifier content indicates the mole of the first modifier per 1 Kg of the modified high cis conjugated diene polymer or the un-modified high cis conjugated diene polymer. The polydispersity index (PDI) is obtained by dividing the weight average molecular weight by the number average molecular weight (Mw/Mn). The weight average molecular weight (Mw) and the number average molecular weight (Mn) are measured by using the weight average molecular weight obtained by the calibration obtained from the commercially available standard styrene, and using the GPC (Waters Company) having a differential refractive index detecting function and a light scattering detecting function.

According to table 2, the PDI of the modified high cis conjugated diene polymer of embodiments 1~7 is smaller than the modified high cis conjugated diene polymer of comparative example 8 and the un-modified high cis conjugated diene polymer of comparative example 9. It indicates that the modified high cis conjugated diene polymer of embodiments 1~7 has a more uniform molecular weight distribution, therefore has uniform and stable physical characteristics.

<Rubber Composition>

The rubber composition is manufactured by using the modified high cis conjugated diene polymer or un-modified high cis conjugated diene polymer of embodiment 1~comparative example 9.

In the process for manufacturing the rubber composition, following materials are used:

Silica (made by ULTRASIL EVONIK)
Oil (#3, CPC Corporation of Taiwan)
Antioxidant (Ix-1076, made by CIBA)
Si69 (bi-3-(triethoxysilyl propyl)tetrasulfide, made by Degussa AG)
Zinc oxide (ZnO, made by HA)
Stearic acid (TPSA1865)
Diphenyl guanidine (made by FLEXSYS)
N-cyclohexyl-2-benzothiazolesulphenamide (CBS, made by FLEXSYS)
Sulfur (Triangle Brand)

In the following description about the manufacturing method for the rubber composition, the mentioned part by weight ("parts per hundred rubber" or "phr") of the specific materials is based on the weight of the modified (or un-modified) high cis conjugated diene polymer regarded as 100 parts by weight. In other words, in the process for manufacturing the rubber composition, the mentioned part by weight of the specific substances is defined according to 100 parts by weight of the modified high cis conjugated diene polymer or the un-modified high cis conjugated diene polymer. For example, 30 parts by weight of silica indicates that the weight of silica: the weight of the modified high cis conjugated diene polymer or un-modified high cis conjugated diene polymer is 30:100.

The rubber composition in embodiments 1~7 and comparative example 9 is manufactured by the following method. After 700 g of the modified high cis conjugated diene polymer or the un-modified high cis conjugated diene polymer is blended for 1 minute, 30 parts by weight of silica, 10 parts by weight of oil, 1 part by weight of antioxidant (Ix-1076) and 4.8 parts by weight of silane coupling agent (Si69) are added and blended for 1.5 minutes. After that, 30 parts by weight of silica are further added, and the mixture is discharged when the temperature reaches 150. After the mixture is pressed to be flat by the roller, it is cooled down to the room temperature. Then, 2 parts by weight of ZnO, 2 parts by weight of the stearic acid and 2 parts by weight of the diphenyl guanidine are respectively added and blended. The above procedure is implemented by a Banbury-type mixer. Then, 2 parts by weight of n-cyclohexyl-2-benzothiazolesulphenamide (CBS) and 2 parts by weight of sulfur are added, and a rubber composition is obtained accordingly. The above procedure is implemented with a roll-type mixer.

The manufacturing method for the rubber composition in comparative example 8 is similar to the manufacturing method for the rubber composition in embodiments 1~7 and comparative example 9, and the differences between which is that in the process for manufacturing the rubber composition in comparative example 8, Si69 and the second modifier (TEOS) are added at the same time in the blending step.

Characteristics of the rubber compositions are shown in table 3.

TABLE 3

|  | Mooney viscosity (MU) | tensile strength (Kg/cm$^2$) | 200% Modulus (Kg/cm$^2$) | elongation at break (ELb) in % |
|---|---|---|---|---|
| Embodiment 1 | 58 | 105 | 69 | 246 |
| Embodiment 2 | 67 | 82 | 65 | 242 |
| Embodiment 3 | 58 | 90 | 69 | 258 |
| Embodiment 4 | 66 | 96 | 73 | 249 |
| Embodiment 5 | 68 | 85 | 66 | 245 |
| Embodiment 6 | 68 | 85 | 73 | 227 |
| Embodiment 7 | 73 | 98 | 70 | 248 |
| Comparative example 8 | 68 | 76 | 64 | 224 |
| Comparative example 9 | 62 | 78 | 65 | 240 |

|  | ΔE' | Tanδ (0° C.) | Tanδ (60° C.) | abrasion loss (c.c.) |
|---|---|---|---|---|
| Embodiment 1 | 5.34 | 0.064 | 0.042 | 0.017 |
| Embodiment 2 | 4.31 | 0.062 | 0.04 | 0.019 |
| Embodiment 3 | 2.94 | 0.06 | 0.038 | 0.017 |
| Embodiment 4 | 3.47 | 0.062 | 0.039 | 0.022 |
| Embodiment 5 | 3.18 | 0.061 | 0.04 | 0.019 |
| Embodiment 6 | 4.15 | 0.06 | 0.041 | 0.032 |
| Embodiment 7 | 4.51 | 0.062 | 0.04 | 0.030 |
| Comparative example 8 | 3.38 | 0.06 | 0.043 | 0.019 |
| Comparative example 9 | 3.66 | 0.063 | 0.046 | 0.020 |

The Mooney viscosity of the rubber composition in table 3 is measured by the MV-2000 equipment according to ASTM D-1646 method. The temperature for measuring is 100. The measuring time is 1+4 minutes. The characteristics of the rubber composition are analyzed by the dynamic mechanical analyzer (DMA Q800, made by TA Instruments. The tensile strength and the elongation ratio at break point is analyzed by ASTM D-412 DieC method. The tensile strength indicates the maximum strength that the test sample can bear during the elongation process. The elongation ratio at break point indicates the elongation percentage at break of the test sample as bearing the maximum strength.

The testing mode of the tensile strength is set to be the stretching mode. The testing frequency is 20 Hz. The testing temperature is set to be 60. From table 3, it is found that the tensile strength of the rubber compositions in embodiments 1~7 is bigger than the tensile strength of the rubber compositions in comparative examples 8~9. The 200% Modulus indicates that strength needed for causing the deformation degree of 200% for the rubber composition. The elongation at break is the deformation degree of the rubber composition at the timing of being broken by stretching.

When measuring the dynamic storage modulus of elasticity (E), the temperature is set at 60, the deformation degree of measurement is 0.5~10%. The dynamic storage modulus difference of elasticity (ΔE') can be obtained by deducting the dynamic storage modulus of elasticity measured when the deformation degree is 10% from the dynamic storage modulus of elasticity measured when the deformation degree is 0.5%. The smaller the value of the dynamic storage modulus difference of elasticity (ΔE') is, the better the compatibility between the rubber composition and silica is. From the results shown in table 3, it is found that the dynamic storage modulus difference of elasticity (ΔE') of the rubber composition in embodiment 3, embodiment 5 is smaller than the dynamic storage modulus difference of elasticity (ΔE') of the rubber composition in comparative example 8, comparative example 9. That is, it is preferable that the amount of the first modifier is controlled to be 0.005~0.009 mol/Kg of the high cis conjugated diene polymer, and the amount of the second modifier is controlled to be 0.0018~0.005 mol/Kg of the high cis conjugated diene polymer. Moreover, it is preferable that the amount mole ration of the first modifier to the second modifier for the high cis conjugated diene polymer is 3~5.

The temperature rising rate is 3 per minute when measuring the loss tangent (tan δ) and the loss tangent is measured at the temperature of 0 and 60. At 0, the high loss tangent indicates the high wet traction of the rubber composition. At 60, the high the loss tangent indicates the high rolling resistance of the rubber composition. From the results shown in table 3, it is found that the tan δ(60) (indicating the rolling resistance) of the rubber composition in embodiments 1~7 is smaller than the tan δ(60) (indicating the rolling resistance) of the rubber composition in comparative example 8~9. That is, it is preferable that the mole ration of the first modifier to the second modifier for the high cis conjugated diene polymer is 0.3~10. Moreover, it is preferable that the high cis conjugated diene polymer has the —CH2-CH(OH)—CH2-O—R1-Si(R2)$_3$ group content of which is 0.001~0.02 mol/Kg of the high cis conjugated diene polymer.

The abrasion loss is analyzed by the abrasion loss analyzer GT-7012-D according to the DIN53 516 method. The test sample has a size of 29 centimeters (diameter)*12.5 centimeters (thickness). The smaller abrasion loss indicates the stronger wear resistance ability. From the results shown in table 3, it is found that the abrasion loss of the rubber compositions in embodiments 1, 2, 3 and 5 is weaker than the abrasion loss of the rubber compositions of comparative examples 8 and 9. That is, it is preferable that as the amount of the first modifier is 0.0018~0.0036 mol/Kg of the high cis conjugated diene polymer, the mole ratio of the first modifier to the second modifier is 0.3~0.5. In addition, as the amount of the first modifier is 0.005~0.009 mol/Kg of the high cis conjugated diene polymer, the mole ratio of the first modifier and the second modifier is 3~5.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A modified conjugated diene polymer, manufactured by a method comprising forming a conjugated diene polymer by a polymerization step and enabling the conjugated diene polymer to react with a first modifier and then react with a second modifier to obtain the modified conjugated diene polymer, wherein
   the modified conjugated diene polymer has a cis-1,4-structure and the cis-1,4-structure is higher than 97%,
   the polydispersity index (PDI) of the modified conjugated diene polymer is greater than 1.8 and less than 2.5,
   the first modifier has a chemical formula of X—R1-Si(R2)$_3$, wherein X is a functional group selected from the group consisting of an epoxypropoxy group, an isocyanate group, and a 2-(3,4-epoxycyclohexyl group), R1 is an alkylene group with 2~3 carbon atoms, R2 is an alkyl group with 2~3 carbon atoms or an alkoxy group with 1~3 carbon atoms;
   the second modifier has a chemical formula of R3-Si(R4)$_3$, wherein R3 is selected from the group consisting of an alkyl group, an alkoxy group, an aromatic group, an aryloxy group and a cycloalkyl group with 1~12 carbon atoms, R4 is selected from the group consisting of an alkyl group, an alkoxy group, an aryloxy group and a cycloalkyl group with 1~12 carbon atoms.

2. The modified conjugated diene polymer according to claim 1, wherein the polymerization step is performed with an existence of a catalyst composition, the catalyst composition comprises:
   a lanthanide series metal organic carboxylate;
   an organic aluminum compound consisting of an aluminium alkyl having a molecular formula of AlR'$_3$, HAlR'$_2$ or R'AlH$_2$, R' is a hydrocarbon group with 8~12 carbon atoms; and
   a Lewis acid consisting of an alkylaluminum halide, wherein a mole ratio of the lanthanide series metal organic carboxylate to a total mole of the Lewis acid and the organic aluminum compound is 1:1.5~1:60, a mole ratio of the lanthanide series metal organic carboxylate to the Lewis acid is 1:0.5~1:10.

3. The modified conjugated diene polymer according to claim 1, wherein the conjugated diene polymer is formed by polymerizing a conjugated diene monomer, wherein the conjugated diene monomer is selected from the group consisting of 1,3-butadiene, isoprene, 2-phenylbutadiene, 2,3-dimethylbutadiene, 1,3-hexadiene, 1,3-octadiene and a combination thereof.

4. The modified conjugated diene polymer according to claim 1, wherein the first modifier is selected from the group consisting of 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, methyl(3-glycidoxypropyl)dimethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyl(methyl)

dimethoxysilane, 3-isocyanatopropyltrimethoxysilane, 3-isocyanatopropyltriethoxysilane, 3-isocyanatopropylmethyldiethoxysilane, 3-isocyanatopropyltriisopropoxysilane, and a combination thereof.

5. The modified conjugated diene polymer according to claim 1, wherein the second modifier is selected from the group consisting of tetraethoxysilane, ethyl(trimethoxy)silane, phenyl(tri-n-butoxy)silane, dicyclohexyl(diphenoxy)silane, didecyl(didecoxy)silane, tetradodecoxysilane, tetraphenoxysilane and a combination thereof.

6. The modified conjugated diene polymer according to claim 1, wherein a weight average molecular weight of the modified conjugated diene polymer is 20,000~1,000,000.

7. The modified conjugated diene polymer according to claim 1, wherein a mole ratio of the first modifier to the second modifier is 0.3~10.

8. The modified conjugated diene polymer according to claim 1, wherein modified conjugated diene polymer has a —CH2-CH(OH)—CH2-O—R1-Si(R2)3 group of 0.001~0.02 mol/Kg of the conjugated diene polymer.

9. The modified conjugated diene polymer according to claim 1, wherein the modified conjugated diene polymer has a —CH2-CH(OH)—CH2-O—R1-Si(R2)3 group of 0.005~0.009 mol/Kg of the conjugated diene polymer.

10. A method for manufacturing a modified conjugated diene polymer, comprising performing a polymerization step to form a conjugated diene polymer, and enabling the conjugated diene polymer to react with a first modifier and then react with a second modifier, wherein,
    the modified conjugated diene polymer has a cis-1,4-structure and the cis-1,4-structure is higher than 97%,
    a the polydispersity index (PDI) of the modified conjugated diene polymer is greater than 1.8 and less than 2.5,
    the first modifier has a chemical formula of X—R1-Si(R2)$_3$, wherein X is a functional group selected from the group consisting of an epoxypropoxy group, an isocyanate group, and a 2-(3,4-epoxycyclohexyl group), R1 is an alkylene group with 2~3 carbon atoms, R2 is an alkyl group with 2~3 carbon atoms or an alkoxy group with 1~3 carbon atoms;
    the second modifier has a chemical formula of R3-Si(R4)$_3$, wherein R3 is selected from the group consisting of an alkyl group, an alkoxy group, an aromatic group, an aryloxy group and a cycloalkyl group with 1~12 carbon atoms, R4 is selected from the group consisting of an alkyl group, an alkoxy group, an aryloxy group and a cycloalkyl group with 1~12 carbon atoms.

11. The method for manufacturing the modified conjugated diene polymer according to claim 10, an amount of the first modifier is 0.005~0.009 mol/Kg of the conjugated diene polymer, an amount of the second modifier is 0.0016~0.009 mol/Kg of the conjugated diene polymer.

12. The method for manufacturing the modified conjugated diene polymer according to claim 10, wherein the conjugated diene polymer is formed by polymerizing 1,3-butadiene.

13. The method for manufacturing the modified conjugated diene polymer according to claim 10, wherein the first modifier is selected from the group consisting of 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, methyl(3-glycidoxypropyl)dimethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyl(methyl)dimethoxysilane, 3-isocyanatopropyltrimethoxysilane, 3-isocyanatopropyltriethoxysilane, 3-isocyanatopropylmethyldiethoxysilane, 3-isocyanatopropyltriisopropoxysilane, and a combination thereof.

14. The method for manufacturing the modified conjugated diene polymer according to claim 10, wherein the second modifier is selected from the group consisting of tetraethoxysilane, ethyl(trimethoxy)silane, phenyl(tri-n-butoxy)silane, dicyclohexyl(diphenoxy)silane, didecyl(didecoxy)silane, tetradodecoxysilane, tetraphenoxysilane and a combination thereof.

15. The method for manufacturing the modified conjugated diene polymer according to claim 10, wherein a weight average molecular weight of the modified conjugated diene polymer is 20,000~1,000,000.

16. The method for manufacturing the modified conjugated diene polymer according to claim 10, wherein a mole ratio of the first modifier to the second modifier is 0.3~10.

* * * * *